United States Patent
Peteln

(10) Patent No.: US 8,343,247 B2
(45) Date of Patent: Jan. 1, 2013

(54) FILTER MODULE

(75) Inventor: Erich Peteln, Blumau-Neuriβhof (AT)

(73) Assignee: Dexwet USA LLC, Atlanta, GA (US)

( * ) Notice: Subject to any disclaimer, the term of this patent is extended or adjusted under 35 U.S.C. 154(b) by 832 days.

(21) Appl. No.: 12/066,233

(22) PCT Filed: Sep. 9, 2005

(86) PCT No.: PCT/AT2005/000359
§ 371 (c)(1),
(2), (4) Date: Jun. 11, 2008

(87) PCT Pub. No.: WO2007/028176
PCT Pub. Date: Mar. 15, 2007

(65) Prior Publication Data
US 2008/0314248 A1    Dec. 25, 2008

(51) Int. Cl.
*B01D 50/00* (2006.01)
(52) U.S. Cl. .......... 55/482; 55/359; 55/385.1; 55/385.3; 55/484; 95/211
(58) Field of Classification Search ............ 55/482, 55/484, 385.1, 385.3, 359; 95/211
See application file for complete search history.

(56) References Cited

U.S. PATENT DOCUMENTS

| | | |
|---|---|---|
| 1,989,773 A | 2/1935 | Snow |
| 2,751,039 A | 6/1956 | Hanly |
| 3,324,630 A | 6/1967 | Teller et al. |
| 3,748,828 A | 7/1973 | Lefebvre |
| 3,791,102 A | 2/1974 | Huntington |
| 3,957,464 A | 5/1976 | Teller |
| 4,217,386 A * | 8/1980 | Arons et al. ................... 428/198 |
| 4,334,900 A * | 6/1982 | Neumann ..................... 55/350.1 |
| 4,343,631 A * | 8/1982 | Ciliberti ........................... 55/302 |
| 4,608,066 A * | 8/1986 | Cadwell, Jr. .................. 55/385.1 |
| 5,997,598 A | 12/1999 | Kobayashi et al. |
| 2002/0104437 A1 | 8/2002 | Peteln |
| 2005/0173331 A1 | 8/2005 | El-Hindi |

FOREIGN PATENT DOCUMENTS

| | | |
|---|---|---|
| DE | 328826 C | 11/1920 |
| EP | 0267697 A2 | 5/1988 |

* cited by examiner

*Primary Examiner* — Jason M Greene
*Assistant Examiner* — Anthony Shumate
(74) *Attorney, Agent, or Firm* — Altera Law Group, LLC

(57) ABSTRACT

The invention relates to a filter module for removing air-polluting materials from machine exhaust, comprising a filter housing with an intake opening and an outlet opening for channeling machine exhaust through, at least one mounting element for mounting the filter module on a machine, and a filter assembly, arranged in the filter housing and comprised of at least two filter groups, arranged in tandem in the direction of flow and comprised of rod-shaped filter elements with a filter medium, said elements being arranged parallel to one another at a constant center-to-center distance and with their longitudinal axis largely crosswise to the direction of flow, wherein the filter elements of two adjacent filter groups are parallel to one another, and are arranged offset in relation to one another, crosswise to their longitudinal axes and to the direction of flow. The filter elements are connected with at least one filter bracket to form at least one filter insert, and the filter insert is detachably connected to the filter housing.

28 Claims, 5 Drawing Sheets

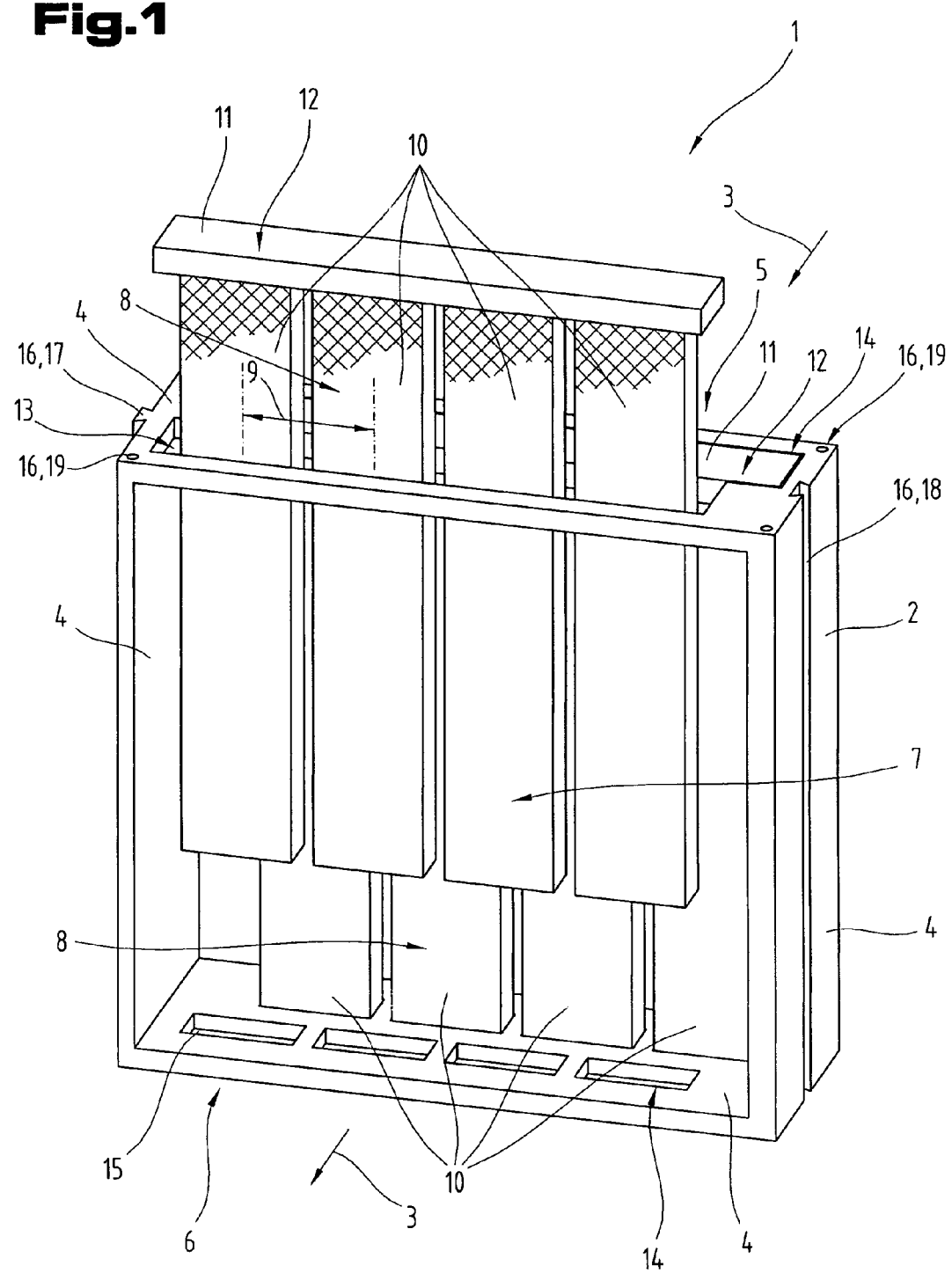

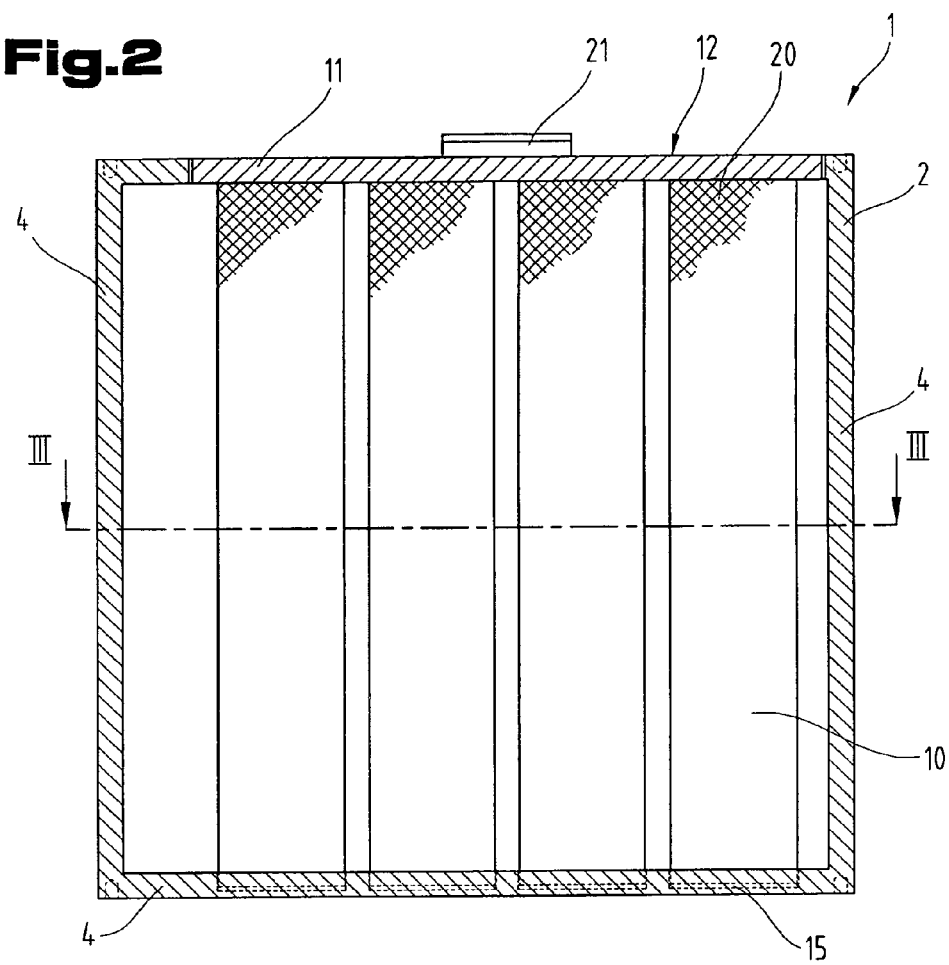
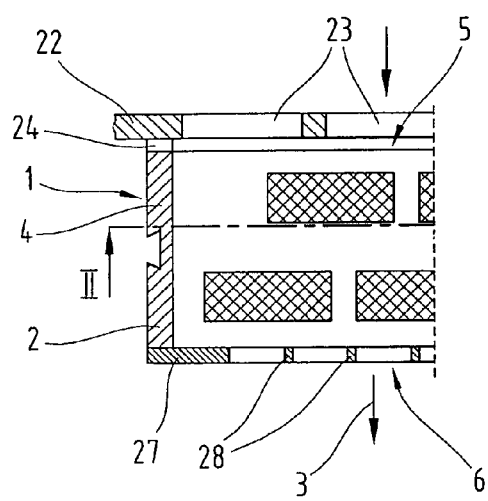
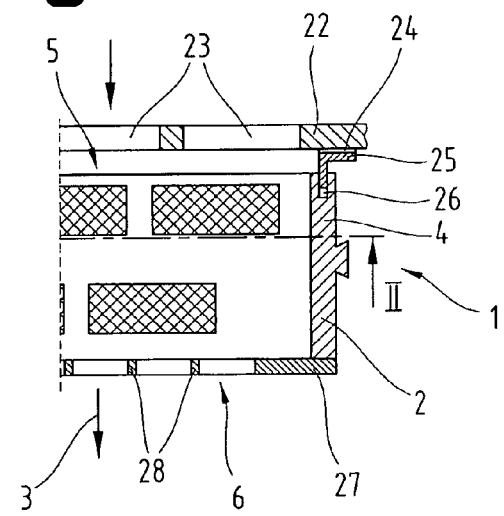

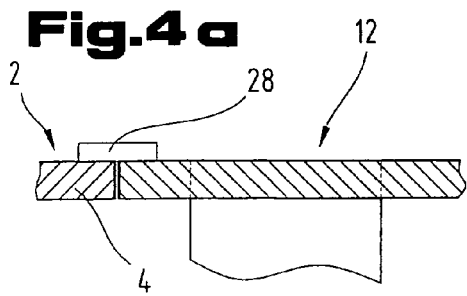
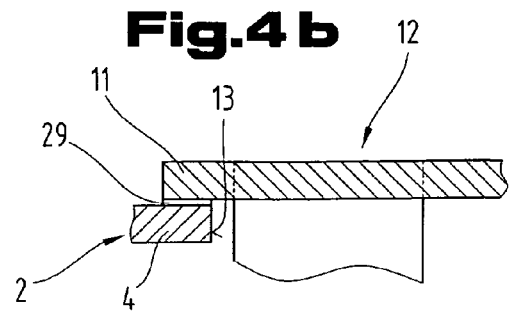
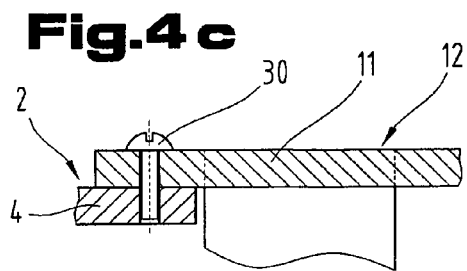
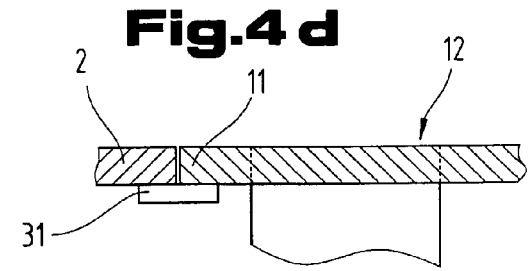
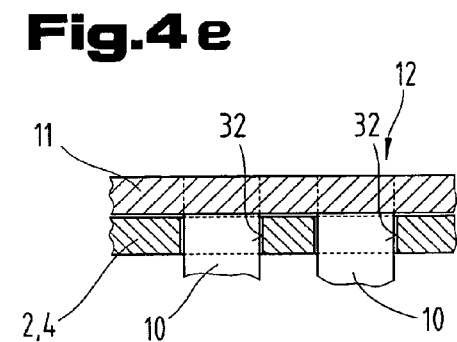
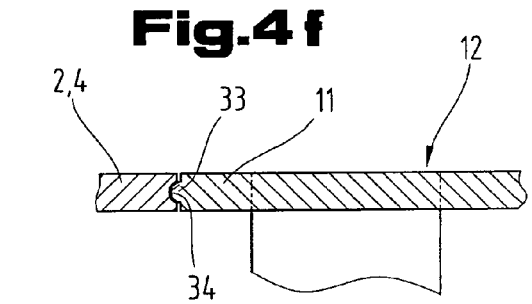
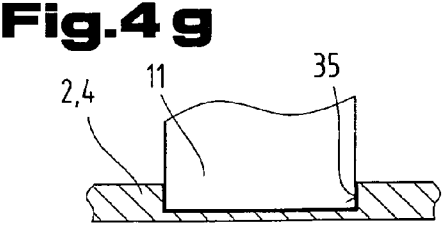
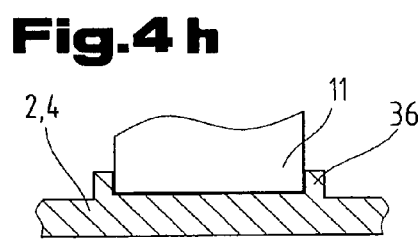
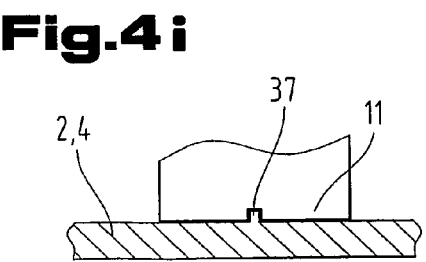
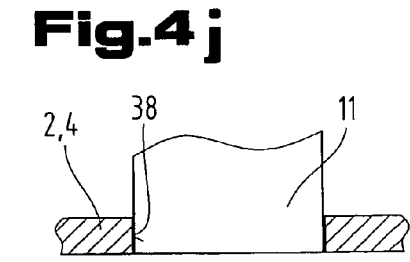

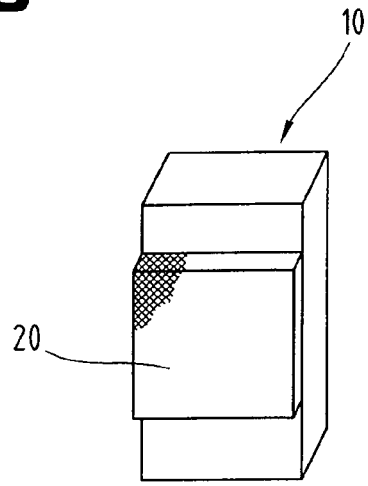
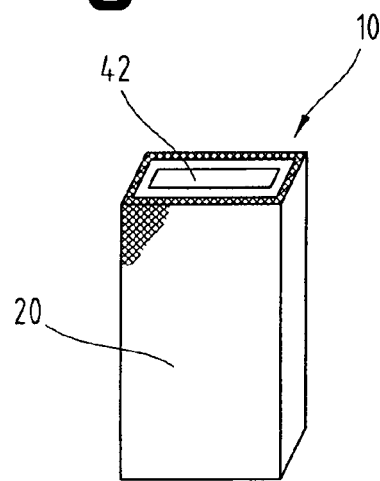
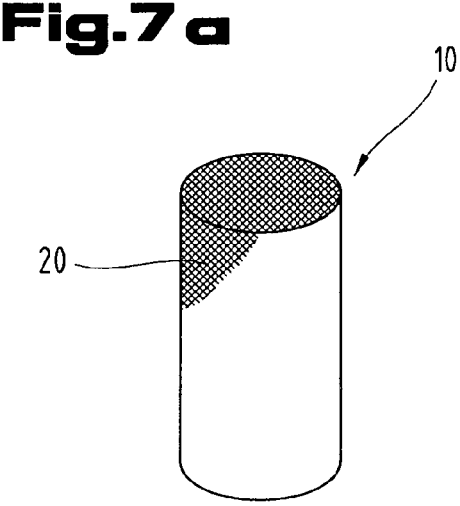
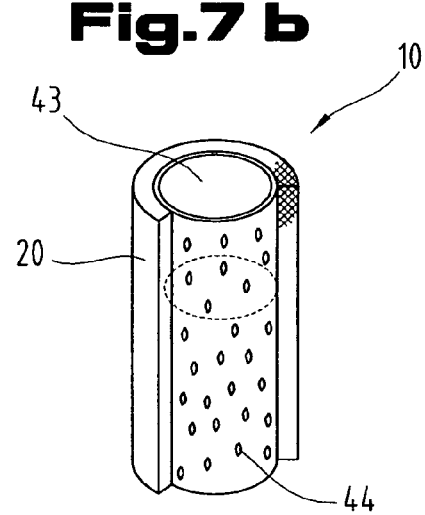
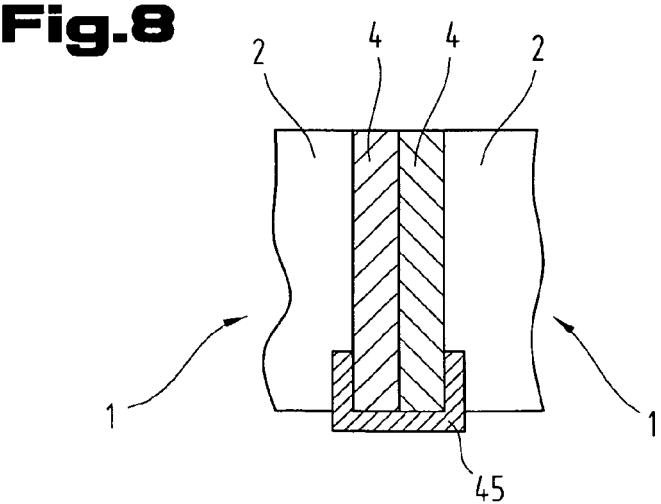

FILTER MODULE

CROSS-REFERENCE TO RELATED APPLICATIONS

This application is a national stage of and claims the benefit of priority of International Patent Application No. PCT/AT2005/000359, filed on Sep. 9, 2005, which is relied on and incorporated herein by reference.

BACKGROUND OF THE INVENTION

The invention relates to a filter module for removing air-polluting materials from machine exhaust, comprising a filter housing with an intake opening and an outlet opening for channeling machine exhaust through, at least one mounting element for mounting the filter module on a machine, and a filter assembly, arranged in the filter housing and comprised of at least two filter groups, arranged in tandem in the direction of flow and comprised of rod-shaped filter elements with a filter medium, said elements being arranged parallel to one another at a constant center-to-center distance and with their longitudinal axis largely crosswise to the direction of flow, wherein the filter elements of two adjacent filter groups are parallel to one another, and are arranged offset in relation to one another, crosswise to their longitudinal axes and to the direction of flow.

From U.S. Pat. No. 6,726,749 B2, a filter device of this type designed for removing air-polluting materials from the exhaust air from machines, especially office machines, is known. This device has a plurality of filter sticks in a filter housing, which sticks are supplied with fluid from a fluid container, and a fastening device for mounting the filter housing on a machine, wherein the filter rods are positioned in the exhaust air flow. As can be seen in FIG. 7 of the US publication, in one embodiment the filter rods are arranged in rows, and the rows are offset in relation to one another. The air-polluting materials are adsorbed as they pass by the filter rods wetted with the fluid, and are thereby removed from the exhaust air flow.

The disadvantage of this system is that each of the filter rods is mounted separately in the filter housing, so that maintenance or replacement of the filter rods is correspondingly laborious and tedious. Also disadvantageous is that the fluid is consumed when the filter device is in use, and the fluid container must be regularly refilled to extend its useful period, to maintain the wetting of the filter rods. This filling process requires a great deal of caution or additional accessories to prevent contamination. Independent of the supply with fluid, if the filter rods are badly soiled following an extended period of use or due to severely polluted machine exhaust, a reconditioning cleaning or replacement of the filter rods or of the entire filter device may be necessary, which, because of the individually attached filter rods, entails high costs from increased handling expenses or a complete replacement.

The object of the invention consists in providing a filter device of the described type that is characterized by a more simplified application and entails only low costs in its production and use.

The object of the invention is attained with a filter module for removing air-polluting materials from machine exhaust, comprising at least two parallel filter groups, arranged in an offset from one another in the direction of flow of exhaust, wherein each filter group includes a plurality of spaced-apart rod-shaped filter elements, and wherein at least two or more spaced-apart rod-shaped filter elements of at least one filter group are connected as a filter insert detachably coupling to a filter housing.

One advantage of the filter module of the invention is the combination of the filter elements with at least one filter bracket to create at least one filter insert, which can be removed from the filter housing. This allows the filter insert to be handled separately from the filter housing, for example in order to more easily clean the filter elements or the filter medium, to replace individual filter elements, or to exchange the entire filter insert. The filter bracket can be a strip-type element, to which the individual filter elements are attached, preferably orthogonally, parallel to one another, and at a constant center-to-center distance; the bracket may also be frame-shaped, for example, fastening both ends of the individual filter elements. The filter medium can be situated both on the outer surface of the filter elements and on the interior of the filter elements if the filter medium is capable of coming into contact with the exhaust air through openings in the surface of the filter elements, for example if the filter element is cage-like in structure.

A further advantageous effect is achieved with a configuration involving multiple filter inserts, especially if multiple rows of filter elements, preferably the individual filter groups, each with its own filter bracket, are combined. This allows the individual filter rows or filter groups to be cleaned or replaced independently of one another, based upon the degree of soiling, thereby reducing the cost of exchanging the filter inserts, since filter inserts that are still usable can continue to be used.

According to another embodiment of the filter module of the invention, offsetting the filter elements of two filter groups, which are arranged in tandem in the direction of flow, by half the center-to-center distance causes maximum redirection of the exhaust air as it passes by the filter elements, thereby improving the removal rate of the filter module.

The formation of a slide-in opening for the filter inserts in the filter housing enables more direct and better access to the individual filter inserts than through the intake opening or the outlet opening, since these permit only sequential access to the individual filter inserts. However, the slide-in opening can also be formed by a series of openings, through which the individual filter elements project into the interior of the filter housing, while the filter bracket remains outside of the filter housing.

According to a further improvement, for a secure positioning of the filter inserts in the filter housing it is advantageous to provide guide elements for securing the assembled position. These can be provided in the form of a longitudinal guide, along which the filter inserts are inserted into the filter housing, or in the form of localized guide elements, which come into force shortly before the proper slide-in position is reached.

One advantageous option for situating a filter insert in the installed position consists, according to a further embodiment, in configuring the slide-in opening as a guide element, wherein said element accommodates the filter bracket with a low level of play, which causes the installed filter insert to be secured crosswise to the slide-in direction. It is also possible to provide a separate slide-in opening for each filter insert, or to position the filter inserts snugly against one another through one common slide-in opening.

According to a further embodiment, an additional guide element configuration can be formed by a recess or opening in the filter housing opposite the slide-in opening, into which one or more filter elements or a frame-type filter bracket extend. Said recess can be limited to the housing wall alone, or can also be formed by a sleeve-like seating element that projects into the interior of the filter housing and accommodates an end section of the filter elements or the filter insert.

To achieve the offset between the filter elements of filter rows arranged in tandem, it is advantageous to offset the guide elements for the individual filter inserts in relation to one another. In this manner, the redirection of the exhaust air flow necessary to produce the cleaning effect is ensured.

For reasons of economic efficiency and user-friendliness it also makes sense, according to a further dependent claim, to configure the filter inserts that form a filter assembly to be structurally uniform. This makes manufacturing more cost-effective due to the larger number of pieces, and makes storage more cost-effective, while reducing the possibility of confusion for the user.

A further increase in user-friendliness can be achieved, according to a further characterizing feature, through a symmetrical configuration of the filter inserts. The more planes of symmetry a filter insert has, the lower the risk of inserting these incorrectly into the filter housing, allowing filter replacement to be performed without difficulty even by technical laypeople. The offset between the individual filter inserts in the embodiments having two or three planes of symmetry is effected by offsetting the guide elements and/or the slide-in openings.

According to a further embodiment, configuring the filter elements to have a large effective cross-section (in other words within a filter group the area of the filter elements that is projected in a plane perpendicular to the direction of flow is larger than the free passage area between the filter elements, which is projected in a plane perpendicular to the direction of flow) causes a sharp redirection when combined with the offset between the filter rows arranged in tandem, and the air-polluting materials contained in the exhaust air are adsorbed at a high level of probability. A further increase in the removal rate can be achieved by arranging more than two filter inserts in tandem, or multiple filter modules in tandem, although this will also increase flow resistance, which is permissible to only a limited extent, in order to avoid any unacceptable interference with the removal of heat from the machine producing the exhaust.

One possibility for reducing the costs of the filter inserts, according to a further dependent claim, consists in detachably connecting the filter elements to the filter bracket, which allows individual filter elements to also be replaced. Especially if the individual filter elements are loaded at different levels with the air-polluting materials or dust particles due to flow conditions, a replacement of individual filter elements can be advantageous. The filter elements can also be removed separately, which with certain embodiments of the filter elements (for example those having a star-shaped cross-section) or filter inserts can facilitate cleaning.

According to a further embodiment, it is advantageous for the filter elements to be attached to the filter bracket by means of a press fit, so that no additional means of attachment are necessary.

According to a described embodiment of the filter module, selecting the material for the filter medium from the group comprised of porous material, fibrous mesh, pulp material or a plastic foam is beneficial for positively influencing the removal rate of the filter module. On one hand, the pores and fibrous components in these materials act as supplementary mechanical collection surfaces, while on the other hand these materials can also serve as a storage medium for a chemically and/or physically active fluid, which adsorbs or absorbs the air-polluting materials. The porous material can be formed, for example, from a ceramic or metallic foam, which have a high level of mechanical stability and therefore are not prone to damage during assembly or cleaning. The fibrous mesh made of inorganic or organic and natural fibers, such as cellulose, cellulose acetate, polyester, etc., is also characterized by a high filtering effect. Plastic foams or latex foam can also be used as the filter medium, especially open-celled materials like PU foam, which is widely used as a wet-filter medium. For certain purposes, several different filter media can also be used in a filter assembly, to combine their respective advantageous properties.

By forming the filter elements from the same material as the filter medium, the filter volume can be substantially increased, allowing the service life of the filter inserts to be extended or the storage volume for fluid to be increased. Furthermore, the reduction in the number of materials used can decrease the cost of manufacturing the filter elements.

It can also be of benefit with certain embodiments to configure the filter medium and the filter element as a single piece, especially if the filter medium is sufficiently strong to withstand without damage the forces that occur during assembly and handling of the filter inserts, for example if the filter medium is sufficiently compressed. With the proper material selection, this can also serve to reduce manufacturing costs.

In a further embodiment of the filter module, the filter medium is provided on only a partial section of each filter element. Thus it is possible, for example, to provide the filter medium in a material-saving fashion only on the side of the filter elements that receives the flow. The expansion of the filter medium can also be limited to a section inside the filter element. In particular, the ends of the filter elements can be structured without filter medium, in order to facilitate attachment on the filter bracket or in the filter housing via a socket connection.

According to a further embodiment, providing the filter medium on the surface of the filter elements opens up a wide range of design possibilities for the shape of the supporting filter elements, and offers good accessibility if the filter elements should require cleaning. With the mentioned filter media it is somewhat difficult to produce complicated cross-sectional shapes, which is why in these cases a subsequent application on the surface of the filter elements is easier to produce. The connection between the filter medium and the filter elements can be mechanical, for example a clamping or spanning of the filter medium, and may involve a separate layer of adhesive or application of the filter medium in an adhesive state, for example by foaming the filter elements with a material that in its hardened state will form the filter medium.

According to a further embodiment, an improvement in the filtering effect of the filter module can be achieved by wetting the filter medium with a fluid selected from the group of fluids glycerin, silicone oil, essential oil, paraffin oil, and/or latex emulsion. The air-polluting materials in the machine exhaust, such as dust, fine dust, ultrafine particles, pollen, spores, bacteria, other aerosols with solid or liquid particles, and in the case of an office machine especially toner dust and/or paper wear debris, can be effectively bonded mechanically when they come in contact with the wetted filter medium, and gaseous pollutants, such as ozone, benzole, phenol, carbon dioxide, formaldehyde or unpleasant odors can also be chemically absorbed and/or neutralized by coming into contact with the fluid. One advantageous effect of these components consists in their low vapor pressure and correspondingly low evaporation rate, which produces a long service life. The viscosity of these fluids is further favorable to an even distribution in the filter medium via the capillary effect that occurs with the wetting of the filter medium. With a correspondingly adjusted high level of viscosity and surface tension, a direct wetting of the filter element is also possible, whereby the filter medium is formed by the fluid.

A further possible embodiment of the filter module consists in adding an olfactory substance to the fluid, allowing the air flowing out of the filter module to release a pleasant scent. By properly adjusting the concentration and the evaporation rate of the olfactory substance, the duration of scent release can be adjusted to the service life of the fluid, with the fading of the scent over time serving as an indicator of the need to change the filter elements or replace the fluid.

According to a further embodiment, it is also advantageous to add an antibacterial, antiviral, antimycotic or fungicidal substance to the fluid, whereby, on one hand, bacteria or mold spores emitted by the machine are rendered harmless when they come into contact with the fluid, and on the other hand the concentration or colonization of the filter elements with bacteria, viruses or fungi is prevented.

To prevent harm to the environment in the cleaning or disposal of the filter medium and/or filter elements that are wetted with the fluid, it is possible, according to one dependent claim, to use a wetting fluid that is readily biodegradable. The biochemical acid requirement for biological degradation in waste water (e.g. BSB5 value) and the Water Hazard Classification should be as low as possible.

Further, according to another embodiment of the filter module it is advantageous to equip the filter medium with an antibacterial surface. This can be accomplished, for example, with a coating or impregnation with silver, especially nanoscale silver, or a silver compound.

According to a further embodiment, it is advantageous to store the fluid within hollow spaces inside the filter elements, and to deliver it slowly to the filter medium via openings, such as small bore holes or slits. In this manner, fluid losses in the filter medium from evaporation can be continuously compensated for, and the service life of the filter elements can be extended.

A possible further improvement consists in forming at least a part of the filter medium from activated carbon, which is characterized by a high capacity for adsorbing polluting gases and odors. When combined with scent-releasing filter elements, the filter elements with activated carbon components in the filter medium should therefore be arranged in front of the scent-releasing filter elements, viewed in the direction of flow.

To remove ferromagnetic particles, such as iron wear debris, from the machine, one embodiment provides that one or more filter elements be equipped with a magnetic element or a magnetic component. This can be a permanent magnet or an electromagnet.

A further embodiment of the filter module is characterized by the fact that the rod-shaped filter elements have an elongate cross-section, in other words a cross-section with a prominent longitudinal axis. This increases the ratio of surface to volume of the filter elements, allowing a large filter surface to be accommodated in a relatively small amount of space.

According to a further embodiment, it is also advantageous to orient the longitudinal axes of the cross-sections crosswise to the direction of flow, in order to create large active surfaces and a sharp redirection of the exhaust air. With this arrangement of the filter elements, the filter module can be configured to be short, viewed in the direction of flow, with multiple filter inserts in tandem.

According to a further embodiment of the filter module, the cross-section of the filter elements can be rectangular, triangular, star-shaped or round in configuration. The rectangular, triangular or round, especially circular, embodiment of the filter elements is easy to produce in terms of manufacturing technology; the rectangular and circular cylindrical forms also favor a symmetrical configuration of the filter inserts. The star-shaped cross-section, in contrast, offers a high value in the ratio of surface to volume of the filter element, allowing a large filter surface to be accommodated in a relatively small space. The cross-sectional shape can also be used to influence the flow of exhaust air through the filter assembly, for example to eddy the flow through cross-sections that are unfavorable to flow, such as rectangular cross-sections, and to intensify contact of the exhaust air with the filter medium, or to calm the flow through cross-sections that are favorable to flow, such as triangular cross-sections, if the exhaust air flow from the machine is strong and turbulent and therefore potentially disruptive.

The mounting element for attaching the filter module to the machine emitting exhaust air can be advantageously comprised of a layer of adhesive, an adhesive strip, a Velcro strip, a screw, a locking pin, or a snap connector, wherein these fastening options are listed only as examples, and other fastening means can also be used. A Velcro connection between the filter housing and the machine especially provides easy assembly and handling by the user. The internal connection between the hook tape and the loop tape of the Velcro strip also acts as a seal between the machine and the filter housing, so that the exhaust air flow is guided largely through the filter module. However, a separate sealing element, such as a self-adhering sponge rubber strip, can also be used as a seal.

It is advantageous to position the mounting element in the area of the intake opening to the filter housing, in order to achieve small and cost-effective mounting components, and to make the attachment visually inconspicuous.

A further advantageous option for mounting the filter module is achieved by forming a groove on the rear side of the filter housing that faces the machine, into which an interconnecting element having an angular profile is inserted, and in that the interconnecting element is attached to the machine by means of the mounting element, preferably a Velcro strip.

According to a further, it is also advantageous to equip the filter housing with one or more connecting elements for connecting it to additional filter modules. Although it is naturally possible to adjust the size of a filter module to the exhaust air opening of the machine, in general it is more cost-effective to produce the filter modules in a uniform size and then assemble a filter device of the proper size by connecting multiple filter modules. Due to the many different types and sizes of machines in which the filter modules can be used, individual assembly from a standard size is more practical than a multitude of special production runs.

According to a further embodiment, the connection between two filter modules can be formed by a locking pin, a mounting rail or mounting groove, a dovetail connection, or a Velcro strip. However, any other types of connections, such as adhesives, screws, clamps, snap connections, etc., may also be used.

According to a further embodiment, in which the edges of two boundary walls of two filter housings are encompassed by a clamp element, can advantageously be implemented on the front side and/or the rear side of the filter housing. The clamp element is configured, for example, as a U-profile, which, when applied, achieves the clamping effect via a press fit.

For easier handling of the filter inserts it is further advantageous for the filter insert to have a handle element on the filter bracket, with which a user can grasp the filter insert when it is installed.

According to a further embodiment, producing the components of a filter module, especially of the filter housing, the filter bracket and/or the filter element, using a plastic injection molding process is economical especially when large piece numbers are required, and achieves consistently high workpiece precision levels and quality. In selecting the plastic to be used, the temperature of the exhaust air must be taken into account, so that during use, no impermissible shape changes in the components of the filter module occur as a result of the exhaust air temperatures.

An easily producible configuration of the separable connection between the filter insert and the filter housing consists, according to a further claim, in providing a non-positive snap connection, especially with a spherical locking projection that engages in a locking recess.

According to a further embodiment, the filter module can be equipped at the outlet opening, in other words at the visible front side, with a covering grid plate. This offers protection against unintended contact with the filter elements, especially if these are wetted with fluid, while also offering visual design possibilities for the front side of the filter module. With a lamellar configuration of the grate rods, the flow of the exiting, filtered air can also be influenced, for example deflecting it in a specific direction. For attaching the covering grid plate, all possible types of attachment, such as screws, clamps, adhesives, etc, are again possible.

BRIEF DESCRIPTION OF THE DRAWINGS

The drawings show:

FIG. 1a perspective illustration of a filter module with a partially removed filter insert;

FIG. 2 a simplified representation of a filter module in vertical section along the line II-II in FIG. 3;

FIG. 3 a horizontal section of two embodiments of the filter module, sectioned along the line III-III in FIG. 2, in a simplified, sectional representation;

FIG. 4 a simplified, sectional representation of several embodiments of the separable connection between a filter insert and a filter housing;

FIG. 6 two embodiments of a filter element in a simplified, perspective representation;

FIG. 7 two additional embodiments of a filter element in a simplified, perspective representation;

FIG. 8 an embodiment of the connection between two filter modules in a simplified, sectional representation.

DETAILED DESCRIPTION OF THE INVENTION

Figure 5A:
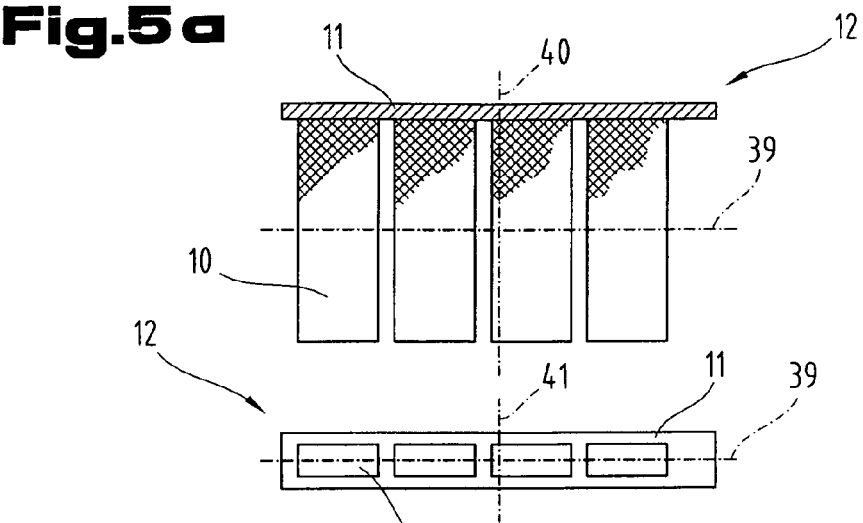
FIG. 5 embodiments of filter inserts with one, two and three planes of symmetry, in a simplified representation, each from a front view and a plan view.

By way of introduction, it is noted that in the differently described embodiments, equivalent parts are designated by the same reference symbols or component descriptions, wherein the disclosures contained in the entire description can be logically transferred to equivalent parts having the same reference symbols or the same component descriptions. Also, positional information selected in the description, such as above, below, to the side, etc., refers to the immediately described or illustrated figure, and, in the case of a position change, can be logically transferred to the new position. Furthermore, individual characterizing features or combinations of features from the illustrated and described exemplary embodiments can also represent solutions that are independent, inventive or specified in the invention.

FIG. 1 shows an embodiment of a filter module 1 according to the invention for removing air-polluting materials from machine exhaust. The exhaust air can come from a multitude of different machines, with an important area of application for the filter module 1 of the invention being machines that emit exhaust air in enclosed spaces in which people may be found. This applies especially to office machines such as copiers, printers or fax machines, which are used widely and frequently. The air-polluting materials to be removed or filtered include dust, fine dust, ultrafine particles, pollen, spores, microorganisms, such as bacteria, and other aerosols containing solid or liquid particles, and in the case of an office machine especially toner dust or paper wear debris, and gaseous contaminants, such as ozone, benzole, phenol, solvents from printer inks and tints, carbon dioxide, formaldehyde, or unpleasant odors.

The following additional areas of application of the filter module of the invention are listed as examples of the multitude of potential applications: installation in or on the outlet of exhaust pipes or chimneys, use as a back-up filter or supplementary filter for vacuum cleaners, use in motor vehicles, for example as a supplementary air filter or as a filter for the air in the interior of the vehicle, for example as a pollen filter, as an industrial filter in power plants, filters for indoor air systems, such as air conditioners or ventilation systems. Express reference is made in this connection to the possible use as a filter for supplied air, ambient air, or intake air for the widest range of machine types.

The body of the filter module 1 is formed by a filter housing 2, which is configured to channel exhaust air from a machine through it. The exhaust air flow or the direction of flow 3 of the exhaust air is indicated by an arrow 3. In the embodiment shown, the filter housing 2 is configured as a rectangular frame with four boundary walls 4, but may also have a different, for example circular, cross-section, viewed in the direction of flow 3, as well as a larger extension, making it tubular in configuration. Furthermore, the cross-section in the direction of flow 3 can be either consistent or adjustable. The exhaust air flows through an intake opening 5 to an outlet opening 6 in the filter housing 2, with these offering the largest possible open cross-section for low-loss channeling.

The exhaust air is filtered through a filter assembly 7 arranged in the interior of the filter housing 2, which is comprised of at least two filter groups 8 arranged in tandem in the direction of flow 3. Each filter group 8 is comprised of multiple rod-shaped filter elements 10, which are arranged with their longitudinal axes largely crosswise to the direction of flow 3 and which are parallel to one another at a consistent center-to-center distance. The filter elements 10 of at least two adjacent filter groups 8 are also parallel to one another. With more than two filter groups 8 in a filter assembly 7, one or more filter groups 8 can also have filter elements 10 with orientations that differ from the two adjacent and parallel filter groups 8.

Regardless of this separation into tandem filter groups 8, in each case multiple filter elements 10 are combined with a filter bracket 11 to form a filter insert 12. In the embodiment represented in the figure, a filter insert 12 is a largely flat structure, with the surface oriented perpendicular to the direction of flow 3. The individual filter elements 10 are rod-shaped with a rectangular cross-section, with the longer side of the rectangle being oriented crosswise to the direction of flow 3. As an alternative to this strip-type configuration, other forms with which especially the effects presented in the introduction to the description can be achieved, such as square, triangular, star-shaped, circular cylindrical or oval cross-sections, are also possible.

The filter brackets 11 create a connection of multiple filter elements 10, wherein in the illustrated embodiment those filter elements 10 that are arranged within a plane perpendicular to the direction of flow 3 are joined, so that precisely one filter group 8 is contained in one filter insert 12. The filter elements 10 of a filter assembly 7 can, however, be joined in the widest variety of ways by altering the configuration of the filter brackets 11, for example by orienting the strip-type filter brackets 11 in the direction of flow 3 so that they join filter elements 10 from different filter groups 8 to one another. It is also possible for all filter elements to be joined by one filter bracket 11, so that the filter assembly 7 is formed by only one filter insert 12.

The filter elements 10 from two filter groups 8 arranged in tandem are not arranged in tandem in a straight line viewed in the direction of flow 3, but are offset, parallel to one another, crosswise to the direction of flow 3. In the exemplary embodiment shown in FIG. 1, two structurally uniform filter inserts 12 are arranged in the filter housing 2, offset in relation to one another by half the center-to-center distance 9, whereby filter elements 10 situated in tandem are also offset in relation to one another, and in each case, a filter element 10 of an adjacent filter group 8 is centered behind a gap formed by two adjacent filter elements 10 of a filter group 8. If the width of the filter elements 10 is greater than half the center-to-center distance 9, as in the illustrated example, it is impossible to pass by the filter assembly 7 in a straight line, which forces a sharp redirection of the exhaust air flowing through, thereby increasing the filtering effect.

With the proper dimensions, the filter inserts 12 can be inserted axially into the filter housing 2 through the intake opening 5 and/or the outlet opening 6, relative to the direction of flow, however it is practical, as shown in the exemplary embodiment, to provide a separate slide-in opening 13 in the filter housing 2 for the filter insert or inserts 12. The slide-in opening 13 is configured such that two bordering filter brackets 11 that are offset in relation to one another can be accommodated with a low level of play. Alternatively, a separate slide-in opening 13 can be provided for each filter insert 12, leaving a greater distance between filter groups 8 arranged in tandem. At the same time, the slide-in opening 13 forms a guide element 14 by accommodating the filter inserts 12 in the installed state with a low level of play, thereby securing their position.

Additional guide elements 14 are formed by recesses 15 in the filter housing 2 into which the unattached ends of the filter elements 10 engage when installed. In many cases, however, the guidance provided by the securing of the filter bracket 11 in the slide-in opening 13 is sufficient.

To connect multiple filter modules 1, this module has multiple connecting elements 16 on the boundary walls 4, which permit a simple assembly of larger filter devices from individual filter modules 1. In FIG. 1, by way of example, two types of connecting elements 16 are shown, wherein on one filter module 1, different or only the same connecting elements 16 may be used. In each case a vertically oriented dovetail rail 17 and a dovetail groove 18 are arranged on the vertical boundary walls 4, and can be used to connect filter modules 1 in a horizontal direction.

For expansion in a vertical direction, 4 bore holes 19 are situated on the horizontal boundary walls 4, into which fastening pins (not shown here) can be inserted, and a connection of filter modules 1 in a vertical direction can be produced.

In FIG. 2, a filter module 1 is shown in vertical cross-section, in which a filter insert 12 inserted into the filter housing 2 is visible. A filter medium 20 is arranged on the filter elements 10 lying in the exhaust air flow, as indicated by a section of cross-hatching. The filter medium 20 is a porous material, which contains hollow spaces and/or capillaries in its interior, and can be impregnated with a fluid. The fluid is a silicone oil type AK 2000 from the Wacker Chemie firm, but can be replaced by any fluids listed in the introduction to the description. With the pores that are contained, the active surface of the filter medium 20 is greatly enlarged over that of a smooth surface, while at the same time the pores form the volume necessary for storing the fluid. In the exemplary embodiment, the filter medium 20 is comprised of polyester fibers, which are pressed into a fibrous composite. Filter media of this and similar types are available, for example, from the Filtrona firm. Of course, other materials can also be used to construct the filter medium 20. The strength of this composite makes it possible to construct the filter element 10 in its entirety from the material of the filter medium 20. The filter element 10 and the filter medium 20 are therefore cost-effectively configured as a single piece. The filter elements 10 are attached to the filter bracket 11 via a press fit, and can be exchanged by simply pulling them out and inserting others.

To make it easier to grasp a filter insert 12 when removing it from the filter housing 2, each filter insert is equipped with a handle element 21.

FIG. 3 shows two exemplary embodiments of the filter module, in horizontal cross-section. In each case a filter module 1 is fastened to a machine housing 22, specifically such that the intake opening 5 of the filter housing 2 is positioned in the extension of the exhaust air openings 23 of the machine. To achieve this, the filter housing 2 is attached via a mounting element 24 to the machine housing 22. The mounting element 24 in the exemplary embodiment is comprised of a Velcro strip with a coordinating loop tape and hook tape, wherein the hook tape is attached to the filter housing 2, for example via adhesive, and the loop tape is attached to the machine housing 22, or vice versa. In FIG. 3a, the mounting element 24 is arranged directly on the boundary wall 4, whereas in FIG. 3b the mounting element 24 is arranged on an angular-profiled interconnecting element 25. This element is situated on the rear side of the filter housing 2, facing the machine, in a groove 26, and enables an adjustment of the distance between the filter module 1 and the machine housing 22 by shifting a leg of the interconnecting element 25 in the groove 26. The interconnecting element 25 has a greater degree of flexibility than the entire filter module 1 and can therefore more easily adjust to uneven areas of the machine housing 22, enabling it to be mounted even on uneven machine housings 22. At the same time, the interconnecting element 25 prevents the exhaust air from escaping laterally between the machine housing 22 and the filter module.

A covering grid plate 27 is fastened over the outlet opening 6 of the filter housing 2, protecting the filter elements against unintended contact, while the configuration of the grid elements 28 [sic] makes it possible to influence the exhaust air flow.

In FIGS. 4a through 4f, various examples for connecting the filter bracket 11 or the filter insert 12 to the filter housing 2 or to an upper boundary wall 4 are shown.

FIG. 4a shows a link plate 28 that overlaps two adjacent edges of the filter housing 2 and the filter bracket 11, and is separably connected to these, for example via an adhesive strip.

FIG. 4b shows a filter bracket 11 that overlaps the filter housing 2 in the area of the slide-in opening 13, wherein a separable connecting means 29, such as a multiple-use adhesive film or a Velcro strip, is arranged in the area of overlap.

FIG. 4c also shows an overlapping arrangement of filter bracket 11 and filter housing 2, with a connection being produced via a screw 30.

FIG. 4d shows an embodiment in which the filter bracket 11 rests on a cross strip 31, which is connected to the filter housing 2. The cross strip 31 can be configured either as a separate component or as a single piece combined with the filter housing 2.

FIG. 4e shows a solution in which the individual filter elements 10 project into the interior of the filter housing 2 through openings 32, and the filter bracket 11 rests on the filter housing 2.

FIG. 4f shows a non-positive snap connection between the filter bracket 11 and the filter housing 2, in which, in the installed position, a spherical locking projection 33 on the filter bracket 11 engages in a locking depression 34 in the filter housing.

FIGS. 4g through 4j show examples of the positioning of the filter elements 10 and/or a filter insert 12 in the interior of the filter housing 2.

FIG. 4g shows a recess 35, into which a filter bracket 11 of a filter insert 12 extends. To facilitate insertion, the recess 35 can be angled, which is not shown here.

FIG. 4h shows a socket-like mount 36, which is arranged on the interior side of a boundary wall 4. This can be configured to form a single piece with the boundary wall 4, or as a separate component that is fastened to the boundary wall 4.

FIG. 4i shows a positioning pin 37, which extends into a recess at the end surface of the filter element 10 or the filter bracket 11. The positioning pin 37 can also have a pointed tip, in which case, especially with relatively soft filter elements, no special recess is required.

FIG. 4j shows a through hole 38 in a boundary wall 4 that serves as the guide element for a filter element 10 and/or a filter bracket 11.

In FIG. 5, various embodiments of filter inserts 12 are shown, each in simplified form, from a frontal view and a plan view.

FIG. 5a shows a filter insert 12 with a pronounced longitudinal axis 39, a vertical axis 40 and a transverse axis 41, comprised of a filter bracket 11 and four filter elements 10 attached thereto and parallel to one another. The filter insert 12 is symmetrical only with reference to a plane spanned by the longitudinal axis 39 and the vertical axis 40. With two filter inserts 12 positioned in tandem according to FIG. 5a, the offset between filter elements 10 in tandem can be achieved by rotating the filter insert 12 halfway around the vertical axis 40, which does not cause the filter brackets 11 to be offset in relation to one another.

Figure 5B:
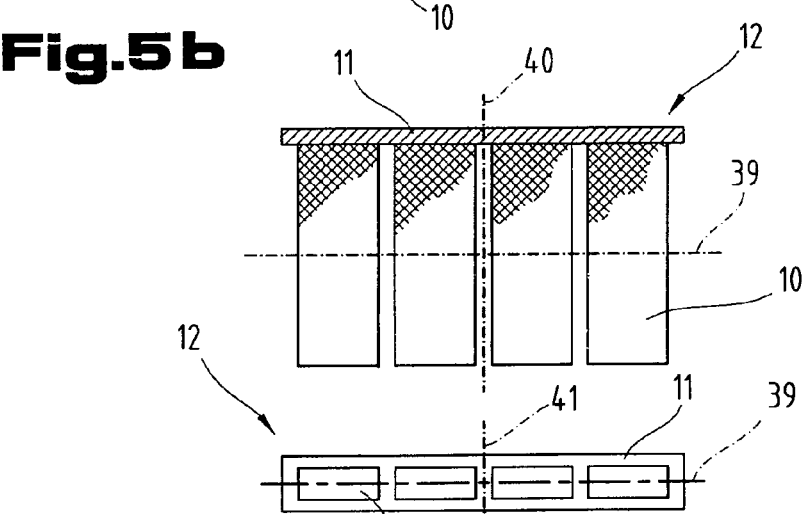

FIG. 5b shows a filter insert 12 with two planes of symmetry, namely the plane that is spanned by the longitudinal axis 39 and the vertical axis 40 and the plane that is spanned by the vertical axis 40 and the transverse axis 41. To achieve an offset between filter elements 10 arranged in tandem, filter brackets 11 arranged in tandem must be offset in relation to one another. The advantage of this embodiment is that individual filter inserts 12 can be turned in the filter housing 2 in order to fully utilize the filtering surfaces on the front and rear sides equally, thereby extending their service life.

Figure 5C:
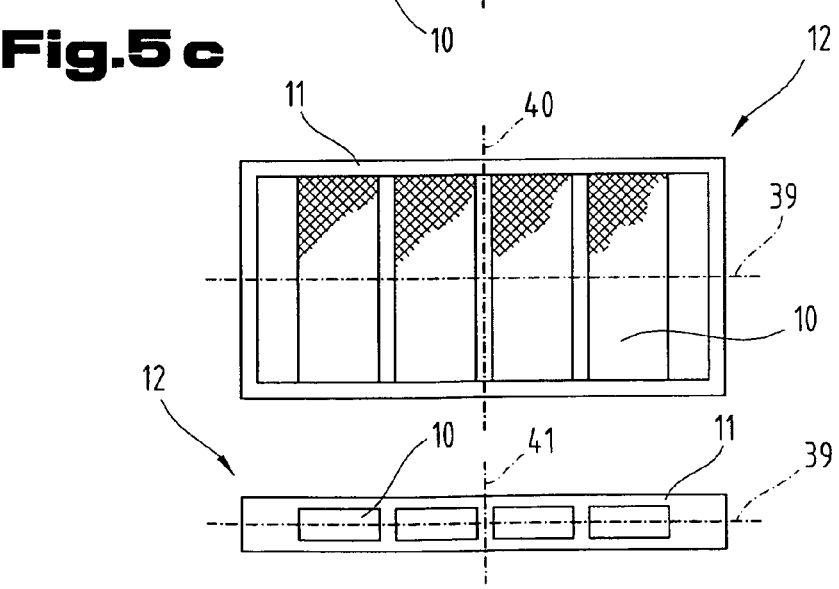

FIG. 5c shows a filter insert 12 with a third plane of symmetry, spanned by the longitudinal axis 39 and the transverse axis 41. For this, both ends of the filter elements 10 must be fastened to a filter bracket 11. Two filter brackets 11 of uniform construction, or one frame-shaped filter bracket 11, can be used for this.

FIG. 6 contains two embodiments of filter elements 10 having rectangular cross-sections, in a simplified, perspective illustration.

FIG. 6a shows a filter element 10 with a rectangular base. Only a section of the surface of this filter element 10 is provided with the filter medium 20. In this embodiment, the unattached ends of the filter element 10 can easily be pressed into a filter bracket 11. With this asymmetrical embodiment, care must be taken in orienting the filter medium 20 during assembly.

FIG. 6b shows a rectangular filter element 10, in which the filter medium 20 extends around the entire periphery. With this embodiment, a filter insert 12 can be turned in order to extend its service life. A magnetic element 42 comprised of a permanent magnet is arranged in the interior of the filter element 10, which increases the collection effect for ferromagnetic particles in the flow of exhaust air.

FIG. 7 contains two embodiments of filter elements 10 having circular cross-sections, in a simplified, perspective illustration.

FIG. 7a shows a circular cylindrical filter element 10, which is formed in its entirety from the filter medium 20. The adsorbent fluid is stored within the porous filter medium 20, and is largely evenly distributed as a result of the capillary effect. This embodiment can be produced very cost-effectively.

FIG. 7b shows a circular cylindrical filter element 10, comprising a circular cylindrical container 43 with filter medium 20 arranged on its outer surface. Said filter medium is fluid-connected to the interior of the container 43 via openings 44, such as narrow bore holes or slits. The container 43 serves as a storage vessel for the fluid, which it delivers to the filter medium 20 through the openings 44 during the period of use.

In FIG. 8, a further variant for connecting two filter modules 1 is shown. A clamp element 45 serves as the connecting means, and connects two boundary walls 4 of two filter housings 2 or filter modules 1 in a non-positive fashion. The clamp element 45 is configured as a U-shaped profile, which is placed over two adjacent edges of two boundary walls 4. This causes the clamp element 45 to become elastically deformed, effecting the non-positive, friction connection as a result of the contact force acting between the fastening walls 4. The clamp element 45 can be placed on the front side and/or on the rear side of the filter housing 2. When the clamp connection is used on only one side, a distance between the boundary walls 4 can be adjusted by applying force to the other side—giving the composite of multiple filter modules a certain flexibility to adjust to uneven machine housings 22.

For the sake of correctness, it is mentioned in closing that for a better understanding of the structure of the filter module 1, said module and/or its components have been illustrated in part not to scale and/or enlarged and/or reduced.

The exemplary embodiments show possible variants of the filter module 1, however it is noted here that the invention is not limited to the specifically represented practical variants; instead, diverse combinations of the individual practical variants are also possible, and this possibility of variation, based upon the teaching regarding technical handling using the objective invention, is within the ability of one of ordinary skill in this technical field. Therefore all conceivable variants that can be implemented by combining individual details of the represented and described variants are included within the scope of protection.

Above all, the embodiments shown specifically in FIGS. 1 through 8 can form the object of autonomous, inventive solu-

I claimed:

1. A filter module for removing air-polluting materials from a flow of machine exhaust, said filter module comprising:
   (a) a filter housing;
   (b) at least two parallel filter groups disposed within the filter housing, each such filter group having a longitudinal axis and a plurality of spaced-apart rod-shaped filter elements;
   (c) a center-to-center distance defined by-at least two or more spaced-apart rod-shaped filter elements of one of such filter groups;
   (d) at least two filter inserts, each said filter insert formed by the connection of at least two or more spaced-apart rod-shaped filter elements of one of said filter groups, said filter insert detachably coupling to the filter housing such as to allow exchanging of single filter inserts independently from other filter inserts;
   (e) wherein each of said filter groups are situated within the filter housing having the longitudinal axis crosswise to the direction of the flow of exhaust, and
   (f) wherein a first of said filter groups is arranged: (i) in front of a second of said filter groups relative to the direction of flow of exhaust so that the exhaust flows through a filter insert of said first filter group then through a filter insert of said second filter group, and (ii) offset longitudinally from a second of said filter groups by half of the center-to-center distance.

2. The filter module according to claim 1, wherein the filter housing includes at least one slide-in opening for sliding in the filter insert crosswise to the direction of flow of exhaust.

3. The filter module according to claim 1, wherein at least one guide element is configured on the filter housing for positioning the filter insert in an installed state.

4. The filter module according to claim 2, wherein at least one guide element is formed by the at least one slide-in opening for positioning the filter insert in an installed state.

5. The filter module according to claim 2, wherein at least one guide element is formed by a recess in the filter housing positioned opposite the at least one slide-in opening.

6. The filter module according to claim 1, further comprising guide elements for each of at least two filter inserts, wherein said guide elements are:
   (a) situated in tandem in the direction of the flow of exhaust; and
   (b) arranged in an offset from one another crosswise to the longitudinal axes of the filter groups and the direction of flow of exhaust.

7. The filter module according to claim 1, wherein within a filter group, a surface area of the filter elements in a plane perpendicular to the direction of flow has a larger surface area than the free passage surface area between the filter elements in a plane perpendicular to the direction of flow of exhaust.

8. The filter module according to claim 1, wherein a plurality of filter elements are separably connected to a filter bracket.

9. The filter module according to claim 8, wherein the filter elements are connected to the filter bracket by means of a press fit.

10. The filter module according to claim 1, wherein the filter elements include a filter medium of material selected from the group consisting of porous material, fibrous mesh, pulp material and plastic foam.

11. The filter module according to claim 1, wherein a filter medium is arranged on only a partial section of at least one filter element.

12. The filter module according to claim 1, wherein a filter medium is arranged on a surface of at least one filter element.

13. The filter module according to claim 12, wherein the filter medium comprises a fluid selected from the group consisting of glycerin, silicone oil, essential oil, paraffin oil and latex emulsion.

14. The filter module according to claim 13, wherein the fluid comprises a scent releasing substance.

15. The filter module according to claim 13, wherein the fluid comprises a substance selected from the group consisting of an antibacterial, antiviral, antimycotic and fungicidal substance.

16. The filter module according to claim 13, wherein the fluid is biodegradable.

17. The filter module according to claim 12, wherein the filter medium comprises a surface selected from the group consisting of an antibacterial, antiviral, antimycotic and fungicidal surface.

18. The filter module according to claim 1, wherein one or more filter elements have hollow spaces configured to hold fluid, and wherein said hollow spaces are fluid-connected to a filter medium of the filter element via one or more openings.

19. The filter module according to claim 1, wherein a filter medium of the filter elements is formed at least partially from activated carbon.

20. The filter module according to claim 1, wherein one or more filter elements comprise a magnetic component.

21. The filter module according to claim 1, wherein one or more filter elements have an elongate cross-section.

22. The filter module according to claim 21, wherein each of said filter elements further comprises a longitudinal axis and wherein the longitudinal axis of the cross-section of one or more of said filter elements is aligned crosswise to the direction of the flow of exhaust.

23. The filter module according to claim 1, wherein one or more filter elements have a cross-sectional shape selected from the group consisting of rectangle, square, triangle, circle, star and oval.

24. The filter module according to claim 1, further comprising a groove on a rear side of the filter housing that (a) faces a machine and (b) is configured to couple to an element with an angled profile for mounting said filter housing on the machine.

25. The filter module according to claim 1, wherein the filter housing includes at least one connecting element for connecting the filter module to one or more additional filter modules.

26. The filter module according to claim 1, further comprising a separable non-positive snap connection between a filter insert and the filter housing.

27. The filter module according to claim 1, wherein the filter housing further comprises an intake opening and an outlet opening and wherein a covering grid plate is arranged at the outlet opening.

28. The filter module according to claim 1, further comprising a mounting element configured for connecting to an exhaust selected from the group consisting of vehicle interior exhaust, air conditioner exhaust, vacuum exhaust and ventilation exhaust.

* * * * *